United States Patent [19]

Payne et al.

[11] 4,338,628
[45] Jul. 6, 1982

[54] SCRAMBLED VIDEO COMMUNICATION SYSTEM

[75] Inventors: Robert W. Payne, San Diego; Wesley F. Smith, San Jose, both of Calif.

[73] Assignee: Dynacom International, Inc., Marietta, Ga.

[21] Appl. No.: 105,127

[22] Filed: Dec. 19, 1979

[51] Int. Cl.³ ............................................. H04N 7/16
[52] U.S. Cl. .................................... 358/120; 358/117; 358/122
[58] Field of Search ................ 358/117, 120, 122, 124

[56] References Cited

U.S. PATENT DOCUMENTS

| | | | |
|---|---|---|---|
| 2,694,104 | 11/1954 | Druz | 358/120 |
| 2,755,333 | 7/1956 | Druz | 358/120 |
| 3,184,537 | 5/1965 | Court et al. | 358/120 |
| 3,313,880 | 4/1967 | Bass | 358/120 |
| 3,530,232 | 9/1970 | Reiter et al. | 358/120 |

Primary Examiner—S. C. Buczinski
Attorney, Agent, or Firm—Brown & Martin

[57] ABSTRACT

A television communication system wherein a composite video signal, is scrambled to prevent a stabilized picture from being displayed by a typical broadcast televison set receiving the scrambled video signal and encoded to enable verification, and wherein a received encoded scrambled video signal is verified and decoded to enable a stabilized picture to be displayed by a typical broadcast television set receiving the decoded video signal. The encoder includes a first circuit for offsetting the DC level of the reference color burst information in a composite video signal to a point nearly midway between the reference black and white levels of the video information; and for removing horizontal synchronizing pulses from the composite video signal to provide a scrambled video signal; a code word generator for generating a code word; and an insert circuit for inserting the code word in the scrambled video signal in regularly spaced positions that normally would be occupied by every nth one of the horizontal synchronizing pulses to thereby encode the scrambled video signal, wherein n is an integer greater than one. The decoder includes a video detector for receiving the encoded scrambled video signal; a code module for storing a predetermined code word; a verification device for comparing the predetermined code word with code words in the received encoded scrambled video signal and for providing verification signals when the predetermined code word is detected in the encoded scrambled video signal; and a second circuit responsive to the verification signals for restoring horizontal synchronizing pulses in the received video signal, and for restoring the DC level of the reference color burst information in the received video signal to the back porch level of the restored synchronizing pulses, to thereby provide the decoded video signal.

32 Claims, 23 Drawing Figures

Fig. 3N   LINE 41

Fig. 3O   LINE 49

Fig. 3P   LINES 41 & 123

Fig. 3Q   LINES 42 & 113

Fig. 3R   LINES 44 & 112

SCRAMBLED VIDEO COMMUNICATION SYSTEM

BACKGROUND OF THE INVENTION

The present invention generally pertains to video communication systems and is particularly directed to a system useful in subscription television wherein the video signal is scrambled to prevent unauthorized use of the video signal by non-subscribers.

It is common practice to scramble a video signal by altering the content or shape of the video signal to prevent a stabilized picture from being displayed by a typical broadcast television set receiving the scrambled video picture. One of the scrambling techniques employed is the alteration of the synchronizing information in the video signal. The scrambled signal is decoded by a decoder connected to the subscriber's television set. The decoder is designed to convert the scrambled signal to enable a stabilized picture to be displayed on the subscriber's typical broadcast television set. Some decoders are enabled only when they are equipped with a "ticket" module containing electronic circuitry essential to the decoding operation, or for recognizing a coded signal that is transmitted with or as a part of the scrambled video signal provided by the encoder. The coded signals and the ticket modules are changed periodically as subscription periods expire and are renewed.

SUMMARY OF THE INVENTION

The present invention is a television communication system wherein a composite video signal is scrambled to prevent a stabilized picture from being displayed by a typical broadcast television set receiving the scrambled video signal and encoded to enable verification, and wherein a received encoded scrambled video signal is verified and decoded to enable a stabilized picture to be displayed by a typical broadcast television set receiving the decoded video signal.

The encoder of the present invention includes a first circuit for offsetting the DC level of the reference color burst information in a composite video signal to a point nearly midway between the reference black and white levels of the video information; and for removing horizontal synchronizing pulses from the composite video signal to provide a scrambled video signal; a code word generator for generating a code word; and an insert circuit for inserting the code word in the scrambled video signal in regularly spaced positions that normally would be occupied by every nth one of the horizontal synchronizing pulses to thereby encode the scrambled video signal, wherein n is an integer greater than one.

The decoder of the present invention includes a video detector for receiving the encoded scrambled video signal; a code module for storing a predetermined code word; a verification device for comparing the predetermined code word with code words in the received encoded scrambled video signal and for providing verification signals when the predetermined code word is detected in the encoded scrambled video signal; and a second circuit responsive to the verification signals for restoring horizontal synchronizing pulses in the received video signal, and for restoring the DC level of the reference color burst information in the received video signal to the back porch level of the restored synchronizing pulses, to thereby provide the decoded video signal.

The offsetting of the DC level of the reference color burst information and the removal of the horizontal synchronizing pulses from the composite video signal causes the horizontal oscillator circuits in a typical broadcast television set to drift out of synchronization and thereby results in the display of a distorted picture.

Additional features of the present invention are described in the description of the preferred embodiment.

BRIEF DESCRIPTION OF THE DRAWING

FIGS. 3A through 3F inclusive are drawn to the same time scale. FIGS. 3G through 3M are drawn to the same time scale. FIGS. 3N and 3"O" are drawn to the same time scale. FIGS. 3P, 3Q and 3R are drawn to the same time scale. FIGS. 3S and 3T are drawn to the same time scale.

DESCRIPTION OF THE PREFERRED EMBODIMENT

Figure 1:
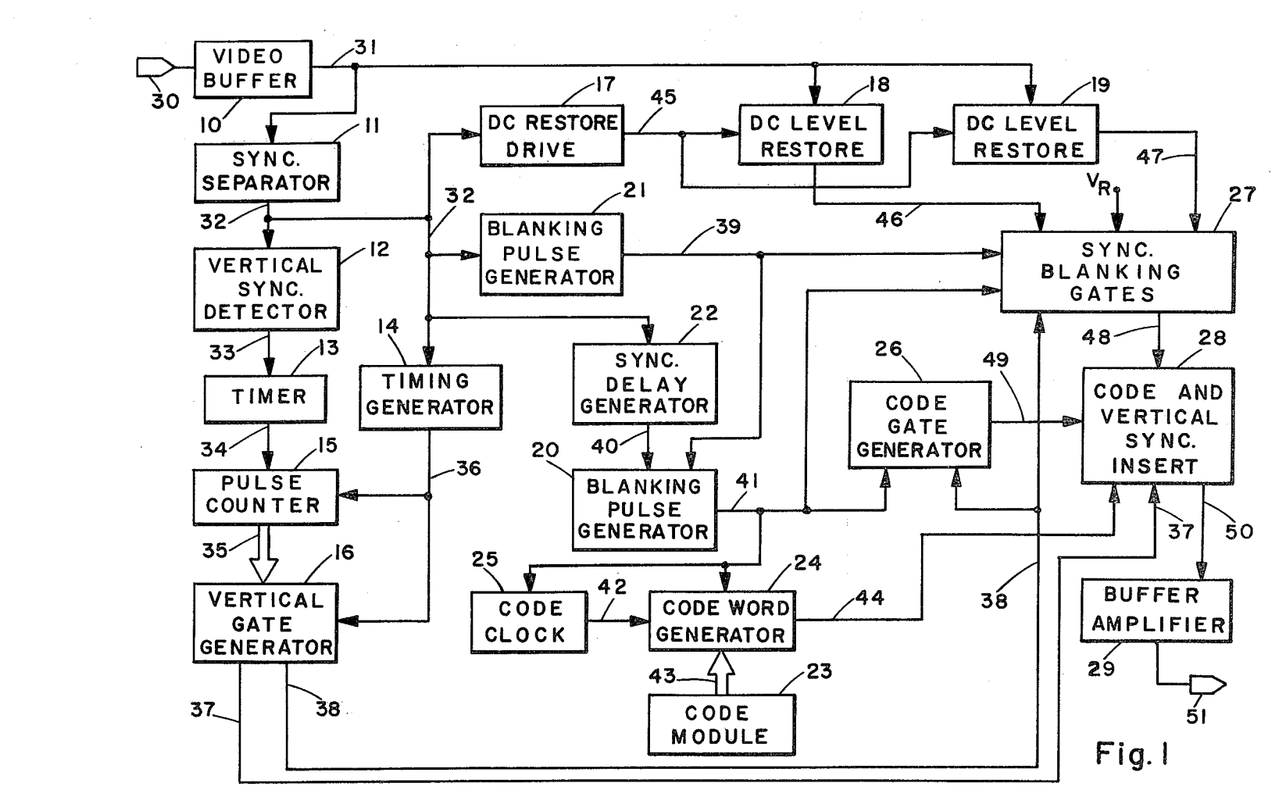
FIG. 1 is a schematic block diagram of the encoder of the present invention.

Referring to FIG. 1, the encoder of the present invention includes a video buffer 10, a sync separator 11, a vertical sync detector 12, a timer 13, a timing generator 14, a pulse counter 15, a vertical gate generator 16, a DC restore drive circuit 17, a first DC level restore circuit 18, a second DC level restore circuit 19, a first blanking pulse generator 20, a second blanking pulse generator 21, a sync delay generator 22, a code module 23, a code word generator 24, a code clock 25, a code gate generator 26, a sync blanking gate circuit 27, a code and vertical sync insert circuit 28, and a buffer amplifier 29.

Figure 2:
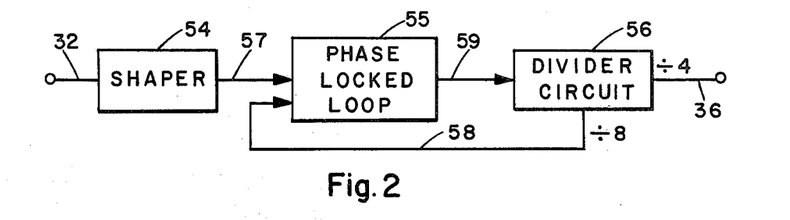
FIG. 2 is a schematic block diagram of the timing generator portion of the encoder shown in FIG. 1.

Referring to FIG. 2, the timing generator 14 includes a pulse shaper 54, a phase locked loop 55 and a divider circuit 56.

A composite video signal provided at an input terminal 30 from a video signal source is fed through the video buffer 10 which has a low output impedance and provides a composite video signal on a line 31 that is isolated from the video signal source.

Figure 3A:
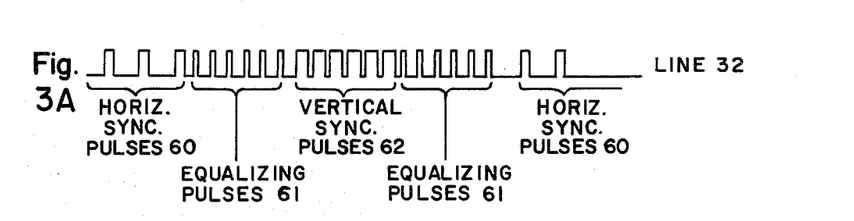
FIGS. 3A through 3T inclusive are waveforms of signals that occur in various portions of the encoder shown in FIG. 1 and the decoder shown in FIG. 4.

The sync separator 11, extracts sync information from the composite video signal on the line 31 and provides a digital pulse train on a line 32 (as shown in FIG. 3A) that contains synchronous horizontal and vertical synchronizing pulses. The pulse train provided on the line 32 includes a chain of horizontal synchronizing pulses 60 followed by a chain of equalizing pulses 61 during each vertical interval of the composite video signal. The equalizing pulses are superimposed upon the vertical sync pulse 62.

Figure 3B:
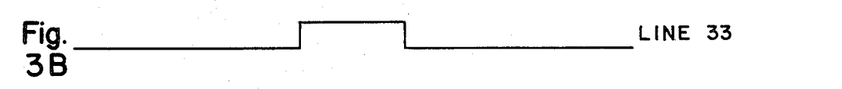

The vertical sync detector 12, detects the vertical sync pulses 62 in the pulse train on the line 32 and provides a delayed vertical sync pulse on a line 33 (as shown in FIG. 3B) that has the duration of the vertical sync pulse 62, but is delayed by approximately one horizontal equalizing pulse. The delay is due to the fact that the vertical sync detector 12 includes a low pass filter followed by a threshold detector for producing the vertical sync pulse on the line 33.

Figure 3C:
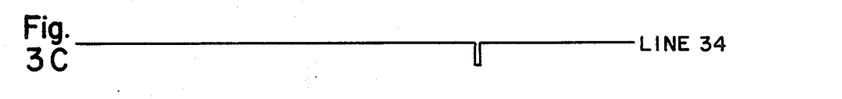

The timer 13 responds to each delayed vertical sync pulse on the line 33 by providing a reset pulse on a line 34 (as shown in FIG. 3C) that is delayed from the trailing edge of the delayed vertical sync pulse on the line 33 by a fixed duration so as to be coincident with the end of the vertical interval.

Figure 3D:
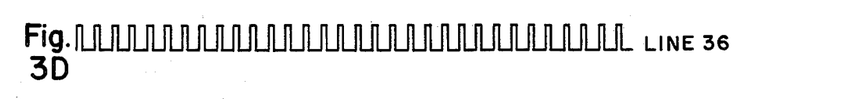

The timing generator 14 responds to the pulse train on the line 32 by providing a pulse train on a line 36 (as shown in FIG. 3D) that includes pulses occuring at twice the horizontal sync pulse rate. Referring to the detailed diagram of the timing circuit in FIG. 2, the pulse shaper 54 squares off the edges of the pulses in the pulse train on line 32 and provides the squared-off pulse train to the phase locked loop 55 via a line 57. A signal is provided at the horizontal sync pulse rate on a line 58 from the "divide-by-eight" output terminal of the divider circuit 56. The phase locked loop 55 responds to the pulse train on the line 57 and the signal on the line 58 by providing a pulse train on a line 59 to the input terminal of the divider circuit 56 at eight times the horizontal sync pulse rate and in phase with the pulse train on the line 57. A pulse train at twice the horizontal sync pulse rate is provided on the line 36 from the "divide-by-four" output terminal of the divider circuit 36.

The pulse counter 15 counts the pulses in the pulse train on the line 36 and provides a parallel binary number count signal on parallel lines 35 to the vertical gate generator 16. The line counter is reset each video field in response to the reset pulse that is provided on the line 34 at the end of each vertical interval.

Figure 3E:
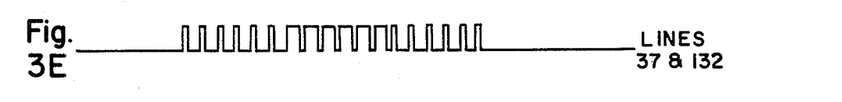
Figure 3F:
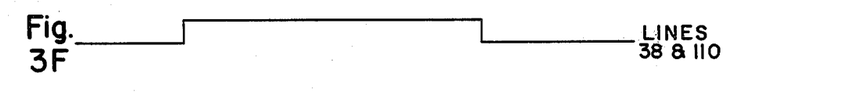

The vertical gate generator 16 is a logic circuit that is designed to respond to the pulse train on the line 36 and the pulse count provided by the parallel signals on the lines 35 to provide a vertical interval pulse train on a line 37 (as shown in FIG. 3E), and a vertical interval blanking pulse on a line 38 (as shown in FIG. 3F).

Figure 3G:
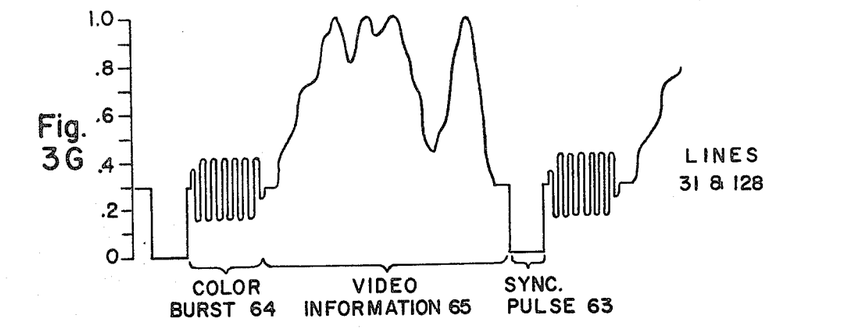

In describing the offsetting of the DC level of the reference color burst information and the removal of the horizontal synchronizing pulses, reference is made to FIG. 3G, which shows the waveform of a portion of the composite video signal on the line 31 containing information for producing a line of a video display. The composite video signal on line 31 has a peak-to-peak voltage of 1.0 volts, as shown in the scale in FIG. 3G. The tip of the horizontal sync pulse 63 is at zero volts. The DC level of the reference color burst information 64 is 0.283 volts, which is the back porch level of the horizontal synchronizing pulses. The video information portion 65 of the composite video signal varies between the "black" level of 0.283 volts and the "white" level of 1.0 volts.

Figure 3H:
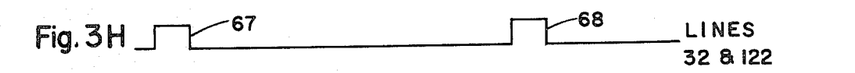
Figure 3I:
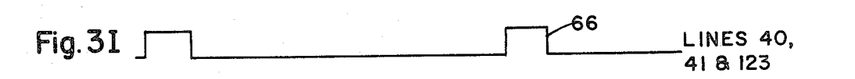

The sync delay generator 22 responds to the pulse train on line 32 (as shown in FIG. 3H) by providing a train of trigger pulses on a line 40 (as shown in FIG. 3"I") wherein the leading edges of the trigger pulses on the line 40 occur approximately 300 nanoseconds prior to the leading edges of the horizontal sync pulses in the pulse train on line 32. This is accomplished by a delay circuit in the sync delay generator 22, that produces the leading edge of the pulse 66 on the line 40 in response to the preceding partially coincident pulse 67 so that the leading edge of the pulse 66 occurs approximately 300 nanoseconds prior to the leading edge of the partially coincident pulse 68 on the line 32. The purpose of this 300 nanosecond lead time is to enable the removal of the horizontal sync pulses from the composite video signal to be initiated at the beginning of the front porch interval of the horizontal sync pulses.

The first blanking pulse generator 20 responds to the train of trigger pulses on the line 40 by providing a coincident train of first blanking pulses on a line 41 (as also shown in FIG. 3"I").

Figure 3J:
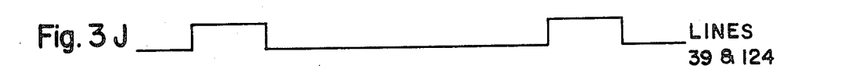

The second blanking pulse generator 21 responds to the pulse train on the line 32 by providing a train of second blanking pulses on a line 39 (as shown in FIG. 3J) that are delayed respectively in response to the horizontal sync pulses in the pulse train on the line 32 to occur during the reference color burst information interval 64 of the composite video signal on the line 31. The second blanking pulse train on the line 39 is also provided to the first blanking pulse generator 20 to terminate the first blanking pulses on the line 41 coincident with the leading edges of the second blanking pulses on the line 39 in the event that the trailing edges of the trigger pulses on the line 40 should not occur until after the leading edges of the second blanking pulses on the line 39.

Figure 3K:
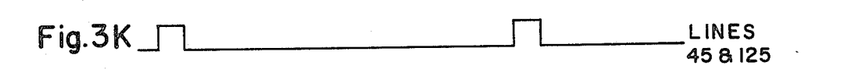

The DC restore drive circuit 17 responds to the pulse train on the line 32 to provide a train of restore drive pulses on a line 45 (as shown in FIG. 3K), wherein the leading edges are coincident with the leading edges of the horizontal sync pulses in the pulse train on the line 32. However the restore drive pulses on the line 45 are of a slightly shorter duration than the horizontal sync pulses in the pulse train on the line 32, in order to complete restoration before the video signal is in transition.

The first DC level restore circuit 18 provides a first restored video signal on a line 46 by clamping the tips of the horizontal sync pulses in the composite video signal on the line 31 to a first given DC level in response to the restore drive pulses on the line 45.

The second DC level restore circuit 19 provides a second restored video signal on a line 47 by clamping the tips of the horizontal sync pulses in the composite video signal on the line 31, to a second given DC level that is 0.317 volts higher than the first given DC level in response to the restore drive pulses on the line 45. The shape of the waveforms of the restored video signals on lines 46 and 47 are the same as the shape of the composite video signal on the line 31.

Figure 3L:
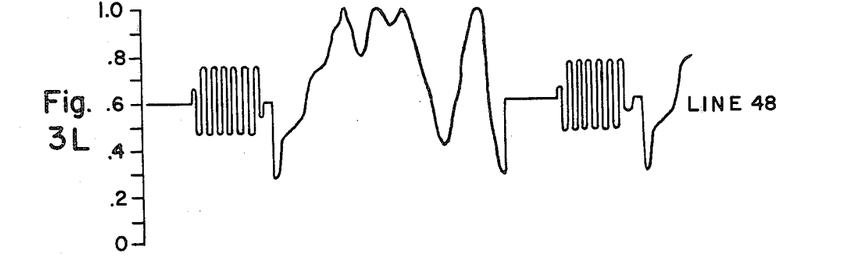

The sync blanking gates 27 constitute an analog multiplexer switching network that responds to the vertical interval blanking pulses on the line 38 and the first and second blanking pulses on the lines 41 and 39 respectively to selectively transfer a DC reference voltage signal $V_R$ and portions of the first and second restored video signals on the lines 46 and 47 respectively to provide a scrambled video signal on a line 48 (as shown in FIG. 3L). The level of the DC reference voltage $V_R$ is 0.6 volts above the first given DC level, which is at a point nearly midway between the reference black and white levels of the composite video signal.

The sync blanking gates 27 provide the scrambled video signal on the line 48 by transferring the reference voltage signal $V_R$ onto the line 48 during the first blanking pulses on the line 41; by transferring the second restored video signal from the line 47 onto the line 48 during the second blanking pulses on the line 39; by transferring the first restored video signal from the line 46 onto the line 48 during the absence of the blanking pulses on the lines 38, 39 and 41; and by transferring the reference voltage signal $V_R$ onto the line 48 during the vertical interval blanking pulses on the line 38.

By combining the first and second restored video signals received from the lines 46 and 47 in the manner described, the DC level of the reference color burst information is offset to a point nearly midway between the reference black and white levels of the video information.

Figure 3M:
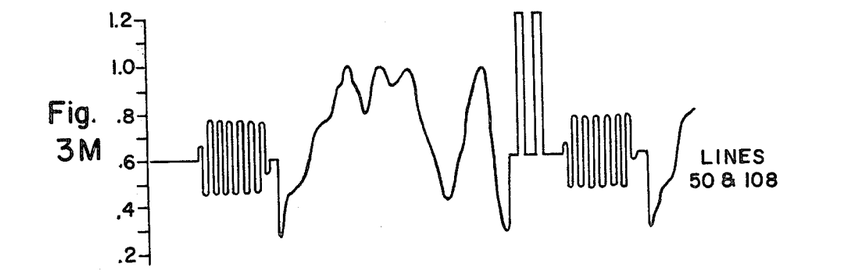

By providing the reference voltage $V_R$ on the line 48 during the first blanking pulses on the line 41, the horizontal sync pulses are in effect blanked and thereby removed from the first restored video signal which is received on the line 46 and provided on the line 48. By providing the reference voltage $V_R$ on the line 48 during the vertical interval blanking pulses on the line 38, the vertical interval pulses are in effect blanked and thereby removed from the scrambled signal provided on the line 48. A waveform of a portion of the scrambled video signal on the line 48 containing a vertical interval 97 and video information 98 for producing the upper portion of a field of a video display is shown in FIG. 3S, wherein the vertical interval 97 is shown as being held at 0.6 volts. The insertion of a vertical pulse train in the scrambled video signal is described below in connection with the description of the code and vertical sync insert circuit 28.

First, however, the encoding of the scrambled video signal is described.

Figure 3N:
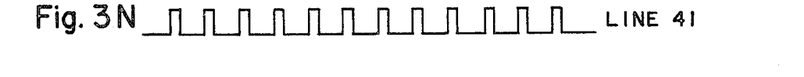
Figure 3O:
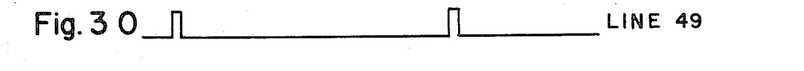

The code gate generator 26 responds to the pulse train of first blanking pulses on the line 41 (as shown in FIG. 3N) by counting the pulses on the line 41 and by providing a pulse train of code gating pulses on a line 49 (as shown in FIG. 3"O") wherein a code gating pulse is provided in response to every eighth one of the blanking pulses on the line 41. The code gate generator 26 is inhibited from providing the code gating pulses on the line 49 while vertical interval blanking pulses are being received on the line 38. The counter in the code gate generator 26 is reset in response to the vertical blanking pulses received on the line 38.

Figure 3P:
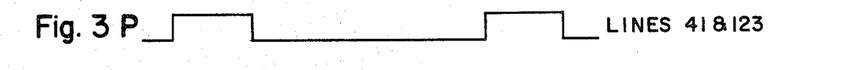
Figure 3Q:
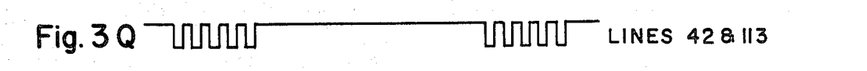

The code clock 25 responds to the pulse train of first blanking pulses on the line 41 (as shown in FIG. 3P) by providing a packet of a predetermined number of code clocking pulses on a line 42 during the "high" level duration of each of the pulses in the pulse train on the line 41. The waveform of the code clocking pulses on the line 42 is shown in FIG. 3Q.

The code module 23 is programmed to provide a digital code word on a number of parallel lines 43 corresponding to the number of bit positions in the code word. The code word includes an initialization bit and a given number of data bits. The predetermined number of code clocking pulses provided in each packet on line 42 also corresponds to the number of bit positions in each code word.

Figure 3R:
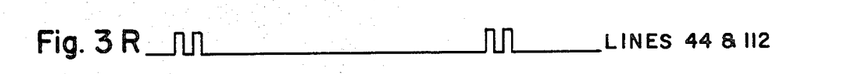
Figure 3S:
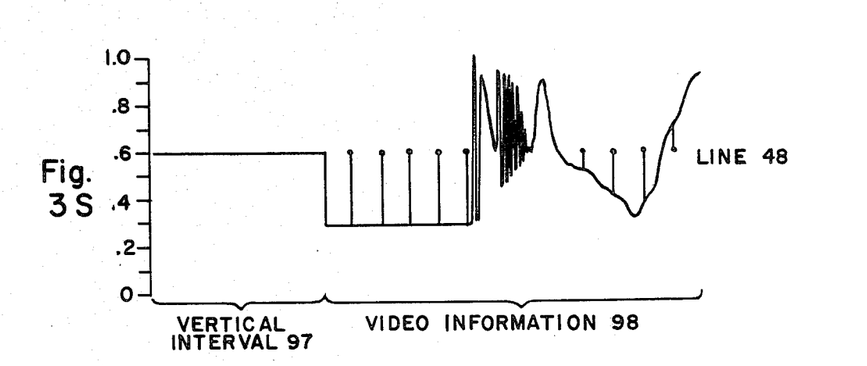

The code word generator 24 is a shift register which responds to the code clocking pulses on the line 42 to provide the code bits from the parallel lines 43 onto a line 44 as a serial code word (as shown in FIG. 3R), to thereby provide a code word on the line 44 during every horizontal sync pulse that is partially coincident with a first blanking pulse on the line 41.

The code and vertical insert circuit 28 includes an analog multiplexer switching network for inserting the code word and the vertical pulse train to provide an encoded scrambled video signal on a line 50. The code and vertical insert circuit 28 inserts the code words from the line 44 in the scrambled video signal on the line 48 when gated by the code gating pulses on the line 49 at one-eighth the horizontal sync rate to thereby provide the code words in those portions of the scrambled video signal that normally would be occupied by every eighth one of the horizontal synchronizing pulses. The code and vertical insert circuit also inserts the vertical pulse train on the line 37 into the scrambled video signal received from the line 48. The vertical pulse train is provided on the line 37 during only the vertical intervals 97 while the code gate generator 26 is inhibited by the vertical interval blanking pulse on the line 38 from providing the code gating pulses on the line 49.

Figure 3T:
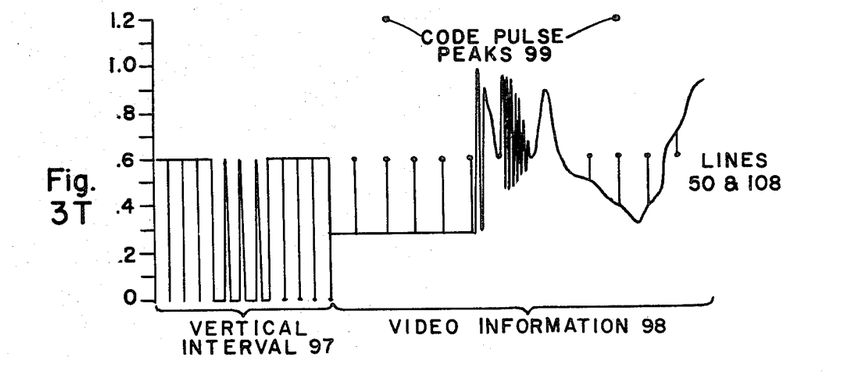

Accordingly an encoded scrambled video signal is provided on the line 50 (as shown in FIGS. 3M and 3T) and fed through the buffered amplifier 29 to an encoder output terminal 51. Referring to the waveforms of FIGS. 3M and 3T it is noted that the code pulse peaks are at a level of approximately 0.2 volts above the white reference level of the video information portion of the scrambled video signal.

The encoded scrambled video signal provided at the output terminal 51 is combined with the aural components of the television signal and placed on an RF carrier for further transmission.

Figure 4:
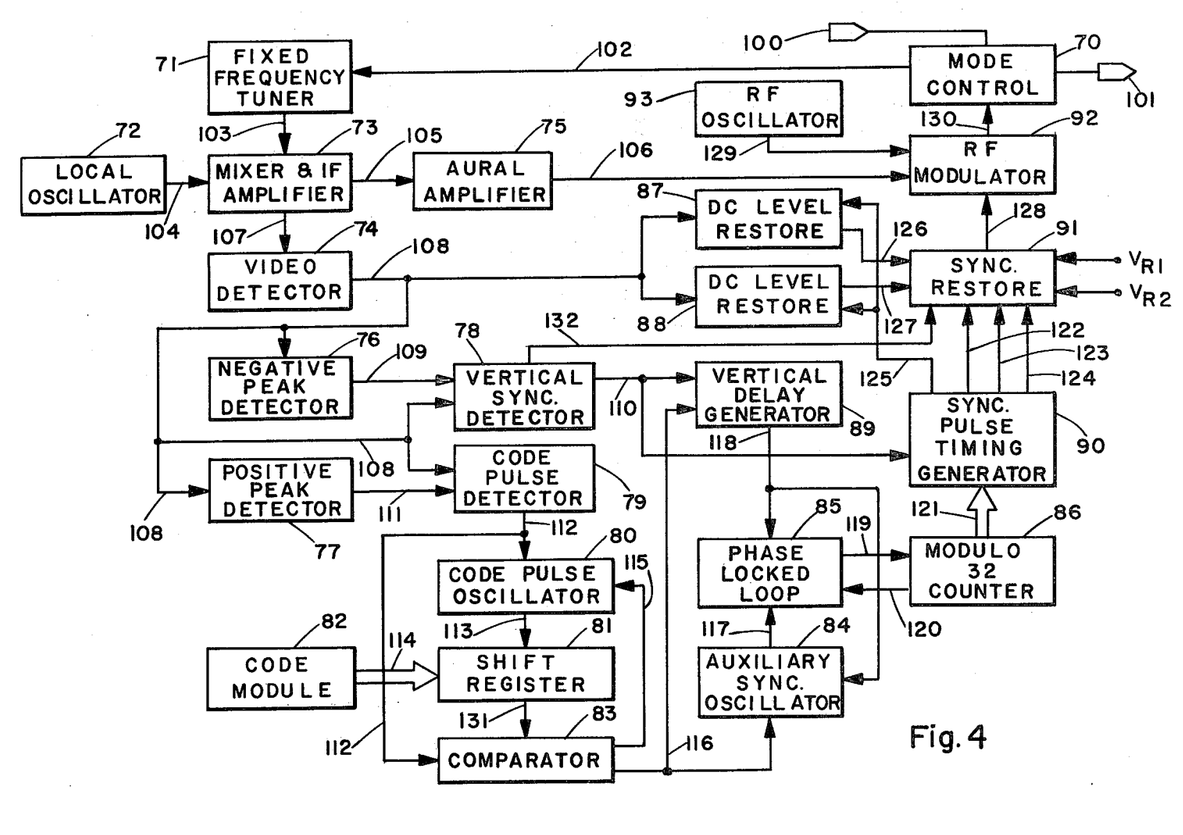
FIG. 4 is a schematic block diagram of the decoder of the present invention.

Referring to FIG. 4, the decoder includes a mode control circuit 70, a fixed frequency tuner 71, a local oscillator 72, a mixer and IF amplifier 73, a video detector 74, an aural amplifier 75, a negative peak detector 76, a positive peak detector 77, a vertical sync detector 78, a code pulse detector 79, a code pulse oscillator 80, a shift register 81, a code module 82, a comparator 83, an auxiliary sync oscillator 84, a phase locked loop 85, a modulo "32" counter 86, a first DC level restore circuit 87, a second DC level restore circuit 88, a vertical delay generator 89, a sync pulse timing generator 90, a sync restore circuit 91, an RF modulator 92, and an RF oscillator 93.

The mode control circuit 70 receives a television signal including the encoded scrambled video signal modulated on an RF carrier signal at an input terminal 100, which may be connected to the RF antenna of a typical broadcast television set. The mode control circuit 70 contains a switch for enabling television signals received at the input terminal 100 to be either routed directly to the RF receiver input terminal 101 of the television, or routed on line 102 to the fixed frequency tuner 71, depending upon whether it is desired to use the television set to display a picture on a "free" channel in response to a normal broadcast video signal, or to display a picture on a "subscription" channel in response to an encoded scrambled video signal.

The fixed frequency tuner 71 is factory aligned to receive the particular RF carrier frequency at which the television signal including the scrambled video signal is communicated between the encoder and the decoder, and provides the received television signal including the encoded scrambled video signal on a line 103 to the mixer and IF amplifier 73.

The mixer and IF amplifier 73 combines and processes the signals on lines 103 and 104 to translate and separate the video signal components and the aural components of the received television signal. The aural components are provided on a line 105 to the aural amplifier 75 which in turn provides a buffered aural signal on a line 106. The encoded scrambled video signal is provided on a line 107 to the video detector 74 which processes the encoded scrambled video signal on line 108 having the same waveform as produced on line 50 of the encoder as shown in FIGS. 3M and 3T.

The negative peak detector 76 responds to the encoded scrambled video signal on the line 108 by providing a first DC reference signal on a line 109 at approximately the same level as the vertical sync tips that occur during the vertical interval 97. See FIG. 3T. Actually the first DC reference signal provided on the line 109 is 0.02 volts more positive than the vertical sync tips of the signal on the line 108 so as to enable positive identification of the vertical sync pulses by a threshold detector in the vertical sync detector 78 that is referenced to the first DC reference signal on the line 109.

The vertical sync detector 78 compares the negative-going excursions of the scrambled video signal on the line 108 with the first DC reference signal provided on the line 109 and provides a vertical interval blanking pulse on the line 110, (as shown in FIG. 3F), that is simultaneous with the vertical interval in the received encoded scrambled video signal. The vertical sync detector 78 also responds to its comparison of the signals on the lines 108 and 109 by providing a vertical interval pulse train on the line 132 (as shown in FIG. 3E) that is simultaneous with the vertical interval in the received encoded scrambled video signal.

The positive peak detector 77 responds to the encoded scrambled video signal on the line 108 by providing a second DC reference signal on a line 111 at approximately the same level as the code pulse peaks 99 that occur in the encoded scrambled video signal during the video information interval 98. See FIG. 3T. The code pulse peaks 99 are approximately 0.2 volts above the reference white level in the video information portion of the video signal. The second DC reference signal provided on the line 111 is 0.02 volts more negative than the code pulse peaks 99 so as to enable positive identification of the code pulse peaks by a threshold detector in the code pulse detector 79 that is referenced by the second DC reference signal on the line 111.

The code pulse detector 79 compares the positive-going excursions of the scrambled video signal on the line 108 with the second DC reference signal provided on the line 111 and provides a received code word signal on the line 112 (as shown in FIG. 3R) that will be identical to the serial code word provided on the line 44 of the encoder.

The code pulse oscillator 80 responds to the received code word signal on the line 112 by providing code clocking pulses on a line 113 (as shown in FIG. 3Q) at half the rate as the code clocking pulses are provided on the line 42 by the code clock 25 in the encoder. The code pulse oscillator 80 is reset to terminate the train of clocking pulses on the line 113 whenever a reset pulse is received on a line 115. The provision of the reset pulse on the line 115 is described in relation to the description of the comparator 83.

The code module 82 provides a decoder digital code word on a number of parallel lines 114 corresponding to the number of bit positions in the code word. The code module 82 preferably includes an encoded ticket for storing the decoder code word. The encoded tickets are sold to the television subscriber. Different encoded tickets must be substituted in the code module 82 from time to time as the code word inserted into the scrambled video signal by the code word generator 24 of the encoder is changed. The decoder code word provided by the code module 82 must be identical to the code word provided by the code module 23 in the encoder in order for the received encoded scrambled video signal on the line 108 to be decoded.

The shift register 81 responds to the clocking pulses on the line 113 to provide the code bits from the parallel lines 114 onto a line 113 as a serial decoder code word (as shown in FIG. 3R).

The comparator 83 compares the received code word on line 112 with the decoder code word on the line 131 on a bit-by-bit basis and provides a verification signal on a line 116 upon comparison of the last bits in the respective words when the received code word on the line 112 is identical to the decoder code word on the line 131. If the comparator 83 detects that any bit of the received code word on the line 112 is not identical to the bit in the corresponding bit position of the decoder code word on line 131, the comparator immediately provides the reset pulse on the line 115 to the code pulse oscillator 80 and thereby terminates further clocking of the shift register 81 by any clockig pulses provided on the line 113. The reset pulse is also provided on the line 115 when the verification signal is provided on the line 116.

The verification signal on the line 116 is a signal pulse that is provided at one-eighth the horizontal sync rate inasmuch as code words are inserted in only one out of every eight positions of the scrambled video signal that normally would be occupied by horizontal sync pulses.

The auxiliary sync oscillator 84 is a free running oscillator that responds to a verification signal pulse on the line 116 by providing a signal on a line 117 to the phase locked loop 85 at one-eighth the horizontal sync rate. Once the auxiliary sync oscillator is keyed on by the verification signal pulse on the line 116 it remains on for the remainder of the video field until reset by a signal on a line 118, even if the comparator 83 should fail to provide a verification signal pulse on the line 116 during any of the subsequent code word positions in the video field. Thus the occasional absence of a verification pulse signal on line 116 caused by noise in the received encoded scrambled video signal will not disrupt the decoding of the received signal.

The phase locked loop 85 provides a signal on a line 119 to the modulo "32" counter 86 at thirty-two times the rate of a signal received at the reference signal input on a line 120 from the "divide-by-32" output terminal of the module "32" counter, and in phase with the signal received on the line 117 from the auxiliary sync oscillator 84. The signal provided on the line 119 from the phase locked loop 85 is a pulse train at the horizontal sync rate.

The modulo "32" counter provides a count on five parallel lines 121 of the pulses in the pulse train on the line 119 from the phase locked loop 85.

The vertical delay generator 89 responds to the vertical interval blanking pulse on the line 110 by providing a delayed vertical gate pulse on the line 118 when a verification signal pulse is also provided on the line 116. The delayed vertical gate pulse on the line 118 is delayed in response to the trailing edge of the vertical interval blanking pulse on the line 110 to occur at a time that corresponds to the first sequential horizontal sync pulse position of the encoded scrambled video signal at which the code word is inserted by the encoder. Referring to FIG. 3T, it is noted that the first sequential horizontal sync pulse position at which the code word is inserted is the second horizontal sync pulse position. Thus, in an embodiment of the decoder corresponding to the waveform of FIG. 3T, the vertical gate pulse on the line 118 would be provided during the second horizontal sync pulse position of each video field.

The delayed vertical gate pulse on the line 118 is provided to turn off both the auxiliary sync oscillator 84 and the phase locked loop 85 until both are again triggered in response to a verification pulse signal being produced on the line 116 from the comparator 83. This keeps the phase locked loop 85 from locking prematurely.

The sync pulse timing generator 90 is a logic circuit that responds to the vertical interval blanking pulses on the line 110 and the count provided on the five parallel output lines 121 of the modulo "32" counter 86 by generating and providing (1) a digital pulse train on a line 122 (as shown in FIG. 3H) that contains horizontal synchronizing pulses; (2) a train of first blanking pulses on a line 123 (as shown in FIG. 3"I") that begin 300 nanoseconds before the leading edge of each horizontal sync pulse (as shown in FIG. 3H) so as to encompass the duration of the front porch of the horizontal sync pulse, and end coincidently with the trailing edge of each horizontal sync pulse; (3) a train of second blanking pulses on a line 124 (as shown in FIG. 3J) that begin coincidently with the trailing edge of each horizontal sync pulse and extend through the reference color burst information interval 64; and (4) a series of restore drive pulses on a line 125 (as shown in FIG. 3K) that begin with the leading edge of each horizontal sync pulse and end slightly before the trailing edge of each horizontal sync pulse, except for every eighth horizontal sync pulse position that is in phase with the signal provided on line 117 in response to the verification of the received code words in the received encoded scrambled video signal. During every such eighth horizontal sync pulse position, there is no pulse whatsoever provided on the line 125. During the vertical interval blanking pulse on the line 110, no pulses are provided on the lines 122, 124 and 125 and a prolonged pulse is provided on the line 123.

The first DC level restore circuit 87 provides a first restored video signal on a line 126 by clamping the reference DC level of the horizontal sync position of the encoded scrambled video signal on the line 108 to a first given DC level in response to the restore drive pulses on the line 125.

The second DC level restore circuit 88 provides a second restored video signal on a line 127 by clamping the reference DC level of the horizontal sync position of the encoded scrambled video signal on the line 108 to a second given DC level that is 0.317 volts below the first given DC level in response to the restore drive pulses on the line 125. The voltage differential of 0.317 volts represents the difference between the back porch level and the point nearly midway between the reference black and white levels of the composite video signal before scrambling by the encoder.

The sync restore circuit 91 is an analog multiplexer switching network that responds to the digital pulse train on the line 122, the first blanking pulses on the line 123 and the second blanking pulses on the line 124 and the vertical interval pulse train on the line 132 to selectively transfer a portion of the first restored video signal on the line 126, a portion of the second restored video signal on the line 127, a first DC reference voltage signal $V_{R1}$ and a second DC reference voltage signal $V_{R2}$ to provide the decoded video signal on the line 128 (as shown in FIG. 3G). The level of the first DC reference voltage signal $V_{R1}$ is the same as the second given DC voltage level. The level of the second DC reference voltage signal $V_{R2}$ is lower than the first DC level by the voltage difference between the horizontal sync tip level and the point nearly midway between the reference black and white levels of the composite video signal before scrambling by the encoder, namely 0.6 volts (see FIG. 3G).

The sync restore circuit 91 provides the decoded video signal on the line 128 by transferring the first restored video signal from the line 126 onto the line 128 during the absence of all of the pulses provided on the lines 122, 123, 124 and 132; by transferring the second restored video signal from the line 127 onto the line 128 during the second blanking pulses on the line 124; by transferring the first DC reference voltage signal $V_{R1}$ onto the line 128 during the first blanking pulses and the prolonged pulse on the line 123 only when no pulses are provided on the lines 122, 124 and 132; and by transferring the second reference voltage signal $V_{R2}$ onto the line 128 when pulses are provided on both lines 122 and 123 and when pulses are provided on both the lines 123 and 132.

By combining the first and second restored video signals received from the lines 126 and 127 and the DC reference voltage signals $V_{R1}$ and $V_{R2}$ in the manner described, the DC level of the reference color burst information in the received video signal is restored to the back porch level of the horizontal synchronizing pulses.

The decoded video signal on the line 128 is fed to the RF modulator 92. The RF modulator receives an RF carrier signal at a frequency corresponding to the subscription channel of the television set over which the decoded video signal is to be displayed on a line 129 from the RF oscillator 93.

The RF modulator 92 also receives the buffered aural signal on the line 106 from the aural amplifier 75. The RF modulator 92 combines the decoded video signal on the line 128 with the aural signal on the line 106 and modulates the RF carrier signal on the line 129 to provide a modulated television signal on the line 130 which is routed through the mode control circuit 70 to the RF receiver input terminal 101 of the television set when the mode control circuit 70 is switched to display a picture on the subscription channel.

In both NTSC and PAL systems the DC level of the reference color burst information is offset to a point nearly midway between the reference black and white levels of the video information, as described above. In a SECAM system the reference back porch level of the horizontal synchronizing pulses is offset to a point nearly midway between the reference black and white levels of the video information upon encoding; and during decoding the second blanking pulses are generated during the reference back porch level interval of the received signal.

Having described our invention, we now claim:

1. A television communication system wherein a composite video signal is scrambled to prevent a stabilized picture from being displayed by a typical broadcast television set receiving the scrambled video signal and encoded to enable verification, and wherein a received encoded scrambled video signal is verified and decoded to enable a stablized picture to be displayed by a typical broadcast television set receiving the decoded video signal, comprising an encoder including
    a first circuit for offsetting the DC level of the reference color burst information in a composite video signal to a point nearly midway between the reference black and white levels of the video information; and for removing horizontal synchronizing pulses from the composite video signal to provide a scrambled video signal;
a code word generator for generating the code word; and
an insert circuit for inserting the code word in the scrambled video signal in regularly spaced positions that normally would be occupied by every nth one the horizontal synchronizing pulses to thereby encode the scrambled video signal, wherein n is an integer greater than 1; and a decoder including
a video detector for receiving the encoded scrambled video signal;
a codemodule for storing a predetermined code word;
a verification device for comparing the predetermined code word with code words in the received encoded scrambled video signal and for providing verification signals when the predetermined code word is detected in the encoded scrambled video signal; and
a second circuit responsive to the verification signals for restoring horizontal synchronizing pulses in the received video signal, and for restoring the DC level of the reference color burst information in the received video signal to the back porch level of the restored synchronizing pulses, to thereby provide the decoded video signal.

2. A system according to claim 1, wherein the encoder further comprises
means for detecting the vertical interval in the composite video signal and for generating a vertical interval blanking pulse and a vertical interval pulse train in response to such detection to occur simultaneously with the vertical interval in the composite video signal; and
the first circuit further comprises
means for blanking the vertical interval of the composite video signal upon providing the scrambled video signal; and
means for inserting the vertical interval pulse train into the scrambled video signal upon encoding the scrambled video signal.

3. A system according to claim 1, wherein the encoder further comprises
means for detecting the vertical sync pulse in the composite video signal; and
wherein the first circuit includes means for referencing the positioning of the code words in the scrambled video signal to the detection of the vertical sync pulse.

4. A system according to claim 1, wherein the first circuit comprises
a first DC level restore circuit for providing a first restored video signal by clamping the tips of the horizontal sync pulses in the composite video signal to a first given DC level;
a second DC level restore circuit for providing a second restored video signal by clamping the tips of the horizontal sync pulses in the composite video signal to a second given DC level that is higher than the first DC level by the voltage difference between the reference black level and a point nearly midway between the reference black and white levels of the composite video signal;
means for providing a reference DC voltage signal at said point nearly midway between the reference black and white levels of the composite video signal;
means for detecting the horizontal sync pulses in the composite video signal;
a first blanking pulse generator responsive to detection of the horizontal sync pulses for providing a first blanking pulse during each horizontal sync pulse of the composite video signal;
a second blanking pulse generator for providing a second blanking pulse during the reference color burst information interval of the composite video signal; and
an analog multiplexer switching network for providing the scrambled video signal by transferring the DC reference voltage signal during the first blanking pulses, by transferring the second restored video signal during the second blanking pulses, and by transferring the first restored video signal during the absence of the first and second blanking pulses between the vertical intervals of the composite video signal.

5. A system according to claim 4, wherein the encoder further comprises
means for detecting the vertical interval in the composite video signal and for generating a vertical blanking pulse in response to such detection to occur simultaneously with the vertical interval; and
wherein the analog multiplexer switching network is adapted for transferring the reference voltage signal as a part of the provided scrambled video signal during each vertical interval blanking pulse.

6. A system according to claim 5, wherein the encoder further comprises
means for generating a vertical interval pulse train in response to detection of the vertical interval in the composite signal to occur simultaneously with the vertical interval; and
wherein the first circuit further includes means for inserting the vertical interval pulse train into the scrambled video signal upon encoding the scrambled video signal.

7. A system according to claim 1, wherein the second circuit comprises
means for generating a digital pulse train of horizontal synchronizing pulses in response to and in phase with the verification signals for indicating horizontal sync positions in the received video signal; and
means for restoring the horizontal synchronizing pulses in the received video signal in response to and in phase with said digital pulse train.

8. A system according to claim 1, wherein the second circuit comprises
a first DC level restore circuit for providing a first restored video signal by clamping the horizontal sync positions of the received video signal to a first given DC level;
a second DC level restore circuit for providing a second restored video signal by clamping the horizontal sync positions of the received video signal to a second given DC level that is lower than the first given DC level by the voltage difference between the back porch level and the point nearly midway between the back porch level and the point nearly midway between the reference black and white levels of the composite video signal;

means for providing a first DC reference voltage signal at the second given DC level;

means for providing a second DC reference voltage signal at a level that is lower than the first given DC level by the amount of voltage differential between the horizontal sync tip level and the point nearly midway between the reference black and white levels of the composite video signal;

means for generating a digital pulse train of horizontal synchronizing pulses in response to and in phase with the verification signals for indicating horizontal sync positions in the received video signal;

means for generating first blanking pulses in response to and in phase with the verification signals during each horizontal sync position in the received video signal, including the front porch position;

means for generating second blanking pulses in response to and in phase with the verification signals during each reference color burst information interval in the received video signal;

an analog multiplexer switching network for providing the decoded video signal by transferring the first restored video signal between the vertical intervals of the received video signal during the absence of all of the first and second blanking pulses and the horizontal synchronizing pulses of the digital pulse train; by transferring the second restored video signal during the second blanking pulses; by transferring the first DC reference voltage signal during the first blanking pulses only when no horizontal sync pulses also are generated; and by transferring the second DC reference voltage signal during the common occurance of the horizontal synchronizing pulses of the digital pulse train and the first blanking pulses.

9. A system according to claim 8, wherein the decoder further comprises means for detecting the vertical interval in the received video signal, and for generating a vertical interval pulse train and a vertical interval blanking pulse in response to such detection to occur simultaneously with the vertical interval in the received signal; and wherein the analog multiplexer switching network is adapted for providing the decoded video signal by also transferring the first DC reference voltage signal during the vertical interval blanking pulse during the absence of the pulses in the vertical interval pulse train; and by transferring the second DC reference voltage signal during the pulses in the vertical interval pulse train.

10. An encoder for a television communication system wherein a composite video signal is scrambled to prevent a stabilized picture from being displayed by a typical broadcast television set receiving the scrambled video signal, comprising means for offsetting the DC level of the reference color burst information in a composite video signal to a point nearly midway between the reference black and white levels of the video information; and for removing horizontal synchronizing pulses from the composite video signal to provide a scrambled video signal;

a code word generator for generating a code word; and an insert circuit for inserting the code word in the scrambled video signal in regularly spaced positions that normally would be occupied by every nth one of the horizontal synchronizing pulses to thereby encode the scrambled video signal; wherein n is an integer greater than 1.

11. An encoder according to claim 10, further comprising means for detecting the vertical interval in the composite video signal and for generating a vertical interval blanking pulse and a vertical interval pulse train in response to such detection to occur simultaneously with the vertical interval in the composite video signal;

means responsive to the vertical interval blanking pulse for blanking pulse for blanking the vertical interval of the composite video signal upon providing the scrambled video signal; and means for inserting the vertical interval pulse train into the scrambled video upon encoding the scrambled video signal.

12. An encoder according to claim 10, further comprising means for detecting the vertical sync pulse in the composite video signal; and means for referencing the positioning of the code words in the scrambled video signal to the detection of the vertical sync pulse.

13. An encoder according to claim 10, comprising a first DC level restore circuit for providing a first restored video signal by clamping the tips of the horizontal sync pulses in the composite video signal to a first given DC level;

a second DC level restore circuit for providing a second restored video signal by clamping the tips of the horizontal sync pulses in the composite video signal to a second given DC level that is higher than the first DC level by the amount of the voltage differential between the reference black level and a point nearly midway between the reference black and white levels of the composite video signal;

means for providing a reference voltage signal at said point nearly midway between the reference black and white levels of the composite video signal;

means for detecting the horizontal sync pulses in the composite video signal;

a first blanking pulse generator responsive to detection of the horizontal sync pulses for providing a first blanking pulse during each horizontal sync pulse of the composite video signal;

a second blanking pulse generator for providing a second blanking pulse during the reference color burst information interval of the composite video signal; and an analog multiplexer switching network for providing the scrambled video signal by transferring the DC reference voltage signal during the first blanking pulses, by transferring the second restored video signal during the second blanking pulses, and by transferring the first restored video signal during the absence of the first and second blanking pulses between the vertical intervals of the composite video signal.

14. An encoder according to claim 13, wherein the encoder further comprises means for detecting the vertical interval in the composite video signal and for generating a vertical blanking pulse in response to such detection to occur simultaneously with the vertical interval; and wherein the analog multiplexer switching network is adapted for transferring the reference voltage signal as a part of the provided scrambled video signal during each vertical interval blanking pulse.

15. An encoder according to claim 14, further comprising
means for generating a vertical interval pulse train in response to detection of the vertical interval in the composite signal to occur simultaneously with the vertical interval; and
wherein the first circuit further includes means for inserting the vertical interval pulse train into the scrambled video signal upon encoding the scrambled video signal.

16. A decoder for a television communication system wherein a composite video signal is scrambled to prevent a stabilized picture from being displayed by a typical broadcast television set receiving the scrambled video signal by offsetting the DC level of the reference color burst information in a composite video signal to a point nearly midway between the reference black and white levels of the video information; and removing horizontal synchronizing pulses from the composite video signal and encoded to enable verification by generating a code word; and inserting the code word in the scrambled video signal in regularly spaced positions that normally would be occupied by every nth one of the horizontal synchronizing pulses to thereby encode the scrambled video signal, wherein n is an integer greater than 1; the decoder comprising
a video detector for receiving the encoded scrambled video signal;
a code module for storing a predetermined code word;
a verification device for comparing the predetermined code word with code words in the received encoded scrambled video signal and for providing verification signals when the predetermined code word is detected in the encoded scrambled video signal; and
means responsive to the verification signals for restoring horizontal synchronizing pulses in the received video signal, and for restoring the DC level of the reference color burst information in the received video signal to the back porch level of the restored synchronizing pulses, to thereby provide the decoded video signal, to thereby enable a stabilized picture to be displayed by a typical broadcast television set receiving the decoded video signal.

17. A decoder according to claim 16, comprising
means for generating a digital pulse train of horizontal synchronizing pulses in response to and in phase with the verification signals for indicating horizontal sync positions in the received video signal; and
means for restoring the horizontal synchronizing pulses in the received video signal in response to and in phase with said digital pulse train.

18. A decoder according to claim 16, comprising
a first DC level restore circuit for providing a first restored video signal by clamping the horizontal sync positions of the received video signal to a first given DC level;
a second DC level restore circuit for providing a second restored video signal by clamping the horizontal sync positions of the received video signal to a second given DC level that is lower than the first given DC level by the voltage difference between the back porch level and the point nearly midway between the back porch level and the point nearly midway between the reference black and white levels of the composite video signal;
means for providing a first DC reference voltage signal at the second given DC level;
means for providing a second DC reference voltage signal at a level that is lower than the first given DC level by the amount of voltage differential between the horizontal sync tip level and the point nearly midway between the reference black and white levels of the composite video signal;
means for generating a digital pulse train of horizontal synchronizing pulses in response to and in phase with the verification signals for indicating horizontal sync positions in the received video signal;
means for generating first blanking pulses in response to and in phase with the verification signals during each horizontal sync position in the received video signal, including the front porch position;
means for generating second blanking pulses in response to and in phase with the verification signals during each reference color burst information interval in the received video signal;
an analog multiplexer switching network for providing the decoded video signal by transferring the first restored video signal between the vertical intervals of the received video signal during the absence of all of the first and second blanking pulses and the horizontal synchronizing pulses of the digital pulse train; by transferring the second restored video signal during the second blanking pulses; by transferring the first DC reference voltage signal during the first blanking pulses only when no horizontal sync pulses also are generated; and by transferring the second DC reference voltage signal during the common occurrence of the horizontal synchronizing pulses of the digital pulse train and the first blanking pulses.

19. A decoder according to claim 18, further comprising
means for detecting the vertical interval in the received video signal, and for generating a vertical interval pulse train and a vertical interval blanking pulse in response to such detection to occur simultaneously with the vertical interval in the received signal; and
wherein the analog multiplexer switching network is adapted for providing the decoded video signal by also transferring the first DC reference voltage signal during the vertical interval blanking pulse during the absence of the pulses in the vertical interval pulse train; and by transferring the second DC reference voltage signal during the pulses in the vertical interval pulse train.

20. A television communication system wherein a composite video signal is scrambled to prevent a stabilized picture from being displayed by a typical broadcast television set receiving the scrambled video signal and encoded to enable verification, and wherein a received encoded scrambled video signal is verified and decoded to enable a stabilized picture to be displayed by a typical broadcast television set receiving the decoded video signal, comprising
an encoder including
a first circuit for offsetting the reference back porch level of the horizontal synchronizing pulses in a composite video signal to a point nearly midway between the reference black and white levels of the video information; and for removing horizontal synchronizing pulses from the composite video signal to provide a scrambled video signal;

a code word generator for generating a code word; and an insert circuit for inserting the code word in the scrambled video signal in regularly spaced positions that normally would be occupied by every nth of one of the horizontal synchronizing pulses to thereby encode the scrambled video signal, wherein n is an integer greater than 1; a decoder including a video detector for receiving the encoded scrambled video signal;

a code module for storing a predetermined code word;

a verification device for comparing the predetermined code word with code words in the received encoded scrambled video signal and for providing verification signals when the predetermined code word is detected in the encode scrambled video signal; and a second circuit responsive to the verification signals for restoring horizontal synchronizing pulses in the received video signal, and for restoring the reference back porch level in the received video signal to the back porch level of the restored synchronizing pulses, to thereby provide the decoded video signal.

21. A system according to claim 20, wherein the first circuit comprises a first DC level restore circuit for providing a first restored video signal by clamping the tips of the horizontal sync pulses in the composite video signal to a first given DC level;

a second DC level restore circuit for providing a second restored video signal by clamping the tips of the horizontal sync pulses in the composite video signal to a second given DC level that is higher than the first DC level by the voltage difference between the reference black level and a point nearly midway between the reference black and white levels of the composite video signal;

means for providing a reference DC voltage signal at said point nearly midway between the reference black and white levels of the composite video signal;

means for detecting the horizontal sync pulses in the composite video signal;

a first blanking pulse generator responsive to detection of the horizontal sync pulses for providing a first blanking pulse during each horizontal sync pulse of the composite video signal;

a second blanking pulse generator for providing a second blanking pulse during the back porch interval of the composite video signal; and an analog multiplexer switching network for providing the scrambled video signal by transferring the DC reference voltage signal during the first blanking pulses, by transferring the second restored video signal during the second blanking pulses, and by transferring the first restored video signal during the absence of the first and second blanking pulses between the vertical intervals of the composite video signal.

22. A system according to claim 21, wherein the encoder further comprises means for detecting the vertical interval in the composite video signal and for generating a vertical blanking pulse in response to such detection to occur simultaneously with the vertical interval; and wherein the analog multiplexer switching network is adapted for transferring the reference voltage signal as a part of the provided scrambled video signal during each vertical interval blanking pulse.

23. A system according to claim 22, wherein the encoder further comprises means for generating a vertical interval pulse train in response to detection of the vertical interval in the composite signal to occur simultaneously with the vertical interval; and wherein the first circuit further includes means for inserting the vertical interval pulse train into the scrambled video signal upon encoding the scrambled video signal.

24. A system according to claim 20, wherein the second circuit comprises a first DC level restore circuit for providing a first restored video signal by clamping the horizontal sync positions of the received video signal to a first given DC level;

a second DC level restore circuit for providing a second restored video signal by clamping the horizontal sync positions of the received video signal to a second given DC level that is lower than the first given DC level by the voltage difference between the back porch level and the point nearly midway between the back porch level and the point nearly midway between the reference black and white levels of the composite video signal;

means for providing a first DC reference voltage signal at the second given DC level;

means for providing a second DC reference voltage signal at a level that is lower than the first given DC level by the amount of voltage differential between the horizontal sync tip level and the point nearly midway between the reference black and white levels of the composite video signal;

means for generating a digital pulse train of horizontal synchronizing pulses in response to and in phase with the verification signals for indicating horizontal sync positions in the received video signal;

means for generating first blanking pulses in response to and in phase with the verification signals during each horizontal sync position in the received video signal, including the front porch position;

means for generating second blanking pulses in response to and in phase with the verification signals during each reference back porch level interval in the received video signal;

an analog multiplexer switching network for providing the decoded video signal by transferring the first restored video signal between the vertical intervals of the received video signal during the absence of all of the first and second blanking pulses and the horizontal synchronizing pulses of the digital pulse train; by transferring the second restored video signal during the second blanking pulses; by transferring the first DC reference voltage signal during the first blanking pulses only when no horizontal synch pulses also are generated; and by transferring the second DC reference voltage signal during the common occurance of the horizontal synchronizing pulses of the digital pulse train and the first blanking pulses.

25. A system according to claim 24, wherein the decoder further comprises means for detecting the vertical interval in the received video signal, and for generating a vertical interval pulse train and a vertical interval blanking pulse in response to such detection to occur simultaneously with the vertical interval in the received signal; and wherein the analog multiplexer switching network is adapted for providing the decoded video signal by also transferring the first DC reference voltage signal during the vertical interval blanking pulse during the absence of the pulses in the vertical interval pulse train; and by transferring the second DC reference voltage signal during the pulses in the vertical interval pulse train.

26. An encoder for a television communication system wherein a composite video signal is scrambled to prevent a stabilized picture from being displayed by a typical broadcast television set receiving the scrambled video signal, comprising means for offsetting the reference back porch level of the horizontal synchronizing pulses in a composite video signal to a point nearly midway between the reference black and white levels of the video information; and for removing horizontal synchronizing pulses from the composite video signal to provide a scrambled video signal;

a code word generator for generating a code word; and an insert circuit for inserting the code word in the scrambled video signal in regularly spaced positions that normally would be occupied by every nth one of the horizontal synchronizing pulses to thereby encode the scrambled video signal, wherein n is an integer greater than 1.

27. An encoder according to claim 26, comprising a first DC level restore circuit for providing a first restored video signal by clamping the tips of the horizontal sync pulses in the composite video signal to a first given DC level;

a second DC level restore circuit for providing a second restored video signal by clamping the tips of the horizontal synch pulses in the composite video signal to a second given DC level that is higher than the first DC level by the amount of the voltage differential between the reference black level and a point nearly midway between the reference black and white levels of the composite video signal;

means for providing a reference voltage signal at said point nearly midway between the reference black and white levels of the composite video signal;

means for detecting the horizontal sync pulses in the composite video signal;

a first blanking pulse generator responsive to detection of the horizontal synch pulses for providing a first blanking pulse during each horizontal synch pulse of the composite video signal;

a second blanking pulse generator for providing a second blanking pulse during the back porch interval of the composite video signal; and an analog multiplexer switching network for providing the scrambled video signal by transferring the DC reference voltage signal during the first blanking pulses, by transferring the second restored video signal during the second blanking pulses, and by transferring the first restored video signal during the absence of the first and second blanking pulses between the vertical intervals of the composite video signal.

28. An encoder according to claim 27, wherein the encoder further comprises means for detecting the vertical interval in the composite video signal and for generating a vertical blanking pulse in response to such detection to occur simultaneously with the vertical interval; and wherein the analog multiplexer switching network is adapted for transferring the reference voltage signal as a part of the provided scrambled video signal during each vertical interval blanking pulse.

29. An encoder according to claim 28, further comprising means for generating a vertical interval pulse train in response to detection of the vertical interval in the composite signal to occur simultaneously with the vertical interval; and wherein the first circuit further includes means for inserting the vertical interval pulse train into the scrambled video signal upon encoding the scrambled video signal.

30. A decoder for a television communication system wherein a composite video signal is scrambled to prevent a stabilized picture from being displayed by a typical broadcast television set receiving the scrambled video signal by offsetting the back porch level of the horizontal synchronizing pulses in a composite video signal to a point nearly midway between the reference black and white levels of the video information; and removing horizontal synchronizing pulses from the composite video signal and encoded to enable verification by generating a code word; and inserting the code word in the scrambled video signal in regularly spaced positions that normally would be occupied by every nth one of the horizontal synchronizing pulses to thereby encode the scrambled video signal, wherein n is an integer greater than 1; the decoder comprising a video detector for receiving the encoded scrambled video signal;

a code module for storing a predetermined code word;

a verification device for comparing the predetermined code word with code words in the received encoded scrambled video signal and for providing verification signals when the predetermined code word is detected in the encoded scrambled video signal; and means responsive to the verification signals for restoring horizontal synchronizing pulses in the received video signal, and for restoring the reference back porch level in the received video signal to the back porch level of the restored synchronizing pulses, to thereby provide the decoded video signal, to thereby enable a stabilized picture to be displayed by a typical broadcast television set receiving the decoded video signal.

31. A decoder according to claim 30, comprising a first DC level restore circuit for providing a first restored video signal by clamping the horizontal sync positions of the received video signal to a first given DC level;

a second DC level restore circuit for providing a second restored video signal by clamping the horizontal sync positions of the received video signal to a second given DC level that is lower than the first given DC level by the voltage difference between the back porch level and the point nearly midway between the back porch level and the point nearly midway between the reference black and white levels of the composite video signal;

means for providing a first DC reference voltage signal at the second given DC level;

means for providing a second DC reference voltage signal at a level that is lower than the first given DC level by the amount of voltage differential between the horizontal sync tip level and the point nearly midway between the reference black and white levels of the composite video signal;

means for generating a digital pulse train of horizontal synchronizing pulses in response to and in phase with the verification signals for indicating horizontal sync positions in the received video signal;

means for generating first blanking pulses in response to and in phase with the verification signals during each horizontal sync position in the received video signal, including the front porch position;

means for generating second blanking pulses in response to and in phase with the verification signals during each reference back porch level interval in the received video signal;

an analog multiplexer switching network for providing the decoded video signal by transferring the first restored video signal between the vertical intervals of the received video signal during the absence of all of the first and second blanking pulses and the horizontal synchronizing pulses of the digital pulse train; by transferring the second restored video signal during the second blanking pulses; by transferring the first DC reference voltage signal during the first blanking pulses only when no horizontal sync pulses also are generated; and by transferring the second DC reference voltage signal during the common occurance of the horizontal synchronizing pulses of the digital pulse train and the first blanking pulses.

32. A decoder according to claim 31, further comprising means for detecting the vertical interval in the received video signal, and for generating a vertical interval pulse train and a vertical interval blanking pulse in response to such detection to occur simultaneously with the vertical interval in the received signal; and wherein the analog multiplexer switching network is adapted for providing the decoded video signal by also transferring the first DC reference voltage signal during the vertical interval blanking pulse during the absence of the pulses in the vertical interval pulse train; and by transferring the second DC reference voltage signal during the pulses in the vertical interval pulse train.

* * * * *